United States Patent Office 3,198,434
Patented Aug. 3, 1965

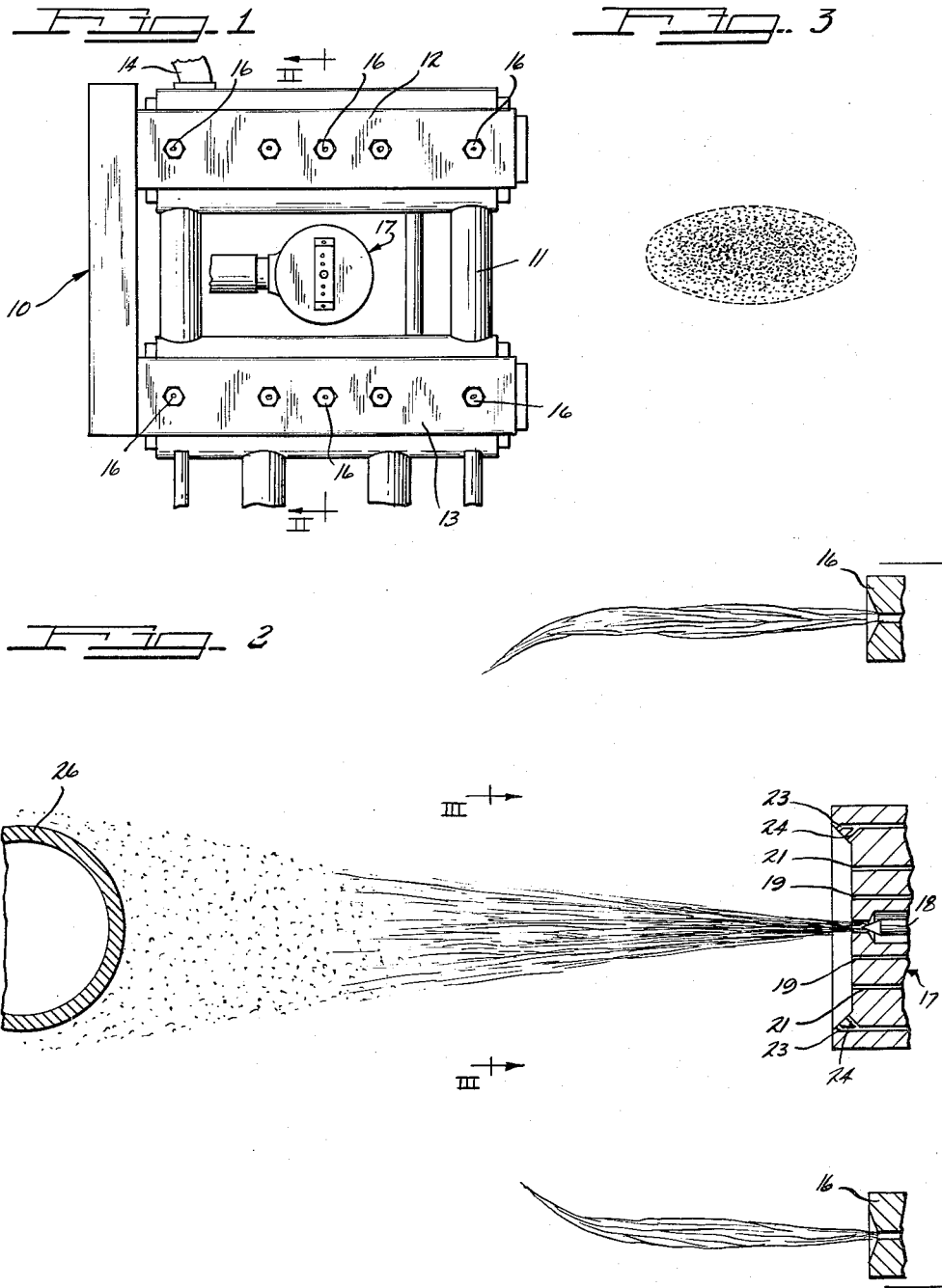

3,198,434
APPARATUS FOR APPLYING HEAT-
REACTIVE COATINGS
Joseph G. Svrchek, Downers Grove, Ill., and Walter S.
Rae, Houston, Tex., assignors to Dearborn Chemical
Company, Chicago, Ill., a corporation of Illinois
Filed Feb. 1, 1961, Ser. No. 86,455
2 Claims. (Cl. 239—79)

This application is a continuation-in-part of application Serial No. 801,181 filed March 23, 1959, now Patent No. 3,028,257.

The present invention is directed to an improved method and apparatus for the application of heat-reactive polymers, and has particular reference to the application of thermosetting resin coatings onto metallic surfaces.

The process and apparatus of the invention are particularly applicable to oily copolymers of conjugated diolefins having from four to six carbon atoms per molecule, such as butadiene, isoprene, dimethyl butadiene, methyl pentadiene, and piperylene with ethylenically unsaturated monomers such as styrene, alkyl styrenes, acrylonitrile, methacrylonitrile, methyl acrylate, methyl methacrylate, vinyl isobutyl ether, methyl vinyl ketone, and isopropenyl methyl ketone. Generally, the copolymer contains from about 60 to 95% of the diolefin and from 5 to 40% of the ethylenically unsaturated monomer.

In the past, the application of such copolymers with a thickness sufficient for commercial usage (usually on the order of 5 to 10 mils) has been carried out only with great difficulty. Normally, the material is combined with a hydrocarbon and/or alcohol diluent and applied carefully over the surface to be coated by spraying or brushing. Then, heat is applied in order to finish the curing of the copolymer while eliminated the diluent. Even when a great deal of care is employed in this procedure, however, the results are not always satisfactory. In order to get a commercially acceptable thickness of coating, the process has to be repeated many times as each successive application of the copolymer results in the production of a film measuring only one or two mils in thickness. Unless great care is taken in the application of the heat to the deposited coating, the diluent becomes entrapped in the copolymer, causing blisters to occur in the coating. This process of applying successive coatings, with careful elimination of the diluent becomes expensive and time consuming.

An object of the present invention is to provide an improved method for the application of heat reactive coatings in a continuous process.

A further object of the invention is to provide an improved method for applying partly polymerized butadiene-styrene copolymers as a tough water resistant, continuous coating on metallic objects such as pipe.

Another object of the present invention is to provide a process for the application of heat-reactive coatings wherein sufficient heat is applied to the polymerizable resin to effect setting of the resin on the surface of the article, without burning the resin.

A further object of the present invention is to provide an improved apparatus for spraying heat-reactive, normally liquid resin compositions while providing a protective envelope of air about the resin spray to prevent burning of the resin.

Still another object of the invention is to provide an improved apparatus for spraying resinous coatings in which the spray pattern can be carefully controlled to prevent undesirable turbulence in the spray pattern.

While the process and apparatus of the present invention are applicable to heat-reactive resinous coatings generally, they find particular applicability to the application of butadiene-styrene copolymers containing about 75 to 85% butadiene and 15 to 25% styrene. Such copolymers can be prepared by reaction of the monomers in the presence of sodium and from 2 to 10% of ditertiary butyl peroxide as described in U.S. Patent No. 2,772,254 to Gleason et al. The oils which result from this process, when dissolved in an equal quantity of hydrocarbon solvent such as mineral spirits, generally have a viscosity between about 0.1 and 20 poises, or about 400 to 20,000 poises when free of diluent.

The pigment wetting properties of the synthetic drying oils can be improved by reacting the oil at 50 to 250° C. with from 0.01 to 2.5% maleic anhydride, chloro-maleic anhydride, or citraconic anhydride, as described in U.S. Patent No. 2,652,342. Treatment of the oil in this manner also serves to render the drying oil more polar.

The hardness of films produced from such oil can be increased by the addition of modifying agents such as maleic acid, fumeric acid, thioglycolic acid, thiosalicylic acid, mercaptophthalic acid, itaconic acid, mesaconic acid, citraconic acid, acrylic acid, or esters thereof in small amounts, as described in U.S. Patent No. 2,733,267 to Koenecke.

The viscosity of the oils can be stabilized by bodying the product at a temperature between 150 and 275° C. in the presence of a small amount of an alkylated phenol as described in U.S. Patent No. 2,767,229 to Gleason.

The color of the oils can be improved by incorporating ether promoters in the reaction mixture, as described in U.S. Patent No. 2,768,984 to Mertzweiller et al.

The copolymers may also be rendered more polar by further reaction with modifiers such as acrylic nitrile, alkyl acrylates, vinyl acetate, vinyl ketones, cinnamaldehyde, thioglycolic acid, and the like, as described in U.S. Patent No. 2,683,162 to Gleason.

While the copolymers described above have excellent film properties, it has been found difficult to apply them in a continuous process to achieve a coating thickness on the order of 5 to 10 mils which is the desired range for the coating of pipe and similar articles. We have now found that materials of this type can be applied in the thickness range given with a continuous process by atomizing the liquid resinous material through a nozzle by means of compressed air, and then providing a curtain of auxiliary air streams about the spray issuing from the nozzle, followed by passing the thus confined spray through a zone of hot gases produced by flame jets. We have had particularly good results by using an oxy-acetylene flame system, but the process can likewise be carried out with other flame generating systems such as air-acetylene, propane-air, propane-oxygen, natural gas-air, and the like.

Where the viscosity of the copolymer is adequately low, the spray may be formed simply by combining the liquid with compressed air and injecting it through the nozzle. Generally, however, it is necessary to provide a diluent to provide the proper spray consistency in the process.

As diluents, we employ materials which are readily volatilized or burned as the mixture of diluent and polymer is injected into the flame zone. Alkanols such as isopropanol and ethanol are particularly preferred, although other diluents such as a petroleum naphtha having a boiling range of about 90 to 120° C., straight run mineral spirits having a boiling range of about 150 to 200° C., or specific hydrocarbons such as butane, pentane, benzene, toluene, xylene, cyclohexane, butenes, pentenes or similar hydrocarbons may be employed. Generally, a sufficient amount of the diluent is added to provide a flowable consistency to the copolymer so that the copolymer can be handled easily in the particular spraying equipment employed. As a general rule, where diluents are required, we suggest using about 50 to 150 parts by weight of the diluents to every 100 parts by weight of the copolymer.

In the process of the present invention, the spray of resin particles issuing from the nozzle would normally tend to fan out into a conical pattern. However, the auxiliary air streams employed to control this spray pattern tend to flatten out the pattern so that the spray as it reaches the article has a substantially oval shape in cross-section. In this way, the liquid resin particles are protected against excessive heat from the very hot flame jets but still absorb enough heat from the zone of hot gases created by the flame jets to achieve substantially complete setting during their transit time from the spray nozzle to the surface of the piece. The resin as it strikes the surface of the article to be coated is still liquid so that it can flow into a continuous film on the work piece. However, the resin film has sufficient absorbed heat so that it sets in a very short time into a completely impervious, continuous coating about the article.

A further description of the present invention will be made in conjunction with the attached drawings which illustrate a preferred embodiment of the invention.

FIGURE 1 is a view in elevation of the spraying assembly illustrating the spray nozzle and the orifices which provide the flame jet;

FIGURE 2 is a cross-sectional view of the spray nozzle and the jets illustrating, somewhat diagrammatically, the manner in which the spray pattern is modified by the auxiliary air streams in passing from the nozzle to the article to be coated; and FIGURE 3 is a view of the shape of the spray pattern which results by virtue of the presence of the air streams.

As shown in the drawings:

In FIGURE 1, reference numeral 10 indicates generally a spraying head embodying the features of the present invention. The head consists of a hollow frame 11 having parallel manifolds 12 and 13 to which a combustible mixture of acetylene and oxygen is supplied by means of a conduit 14. The manifolds 12 and 13 are provided with jets 16 which direct the flames in a generally parallel direction to the axis of the head.

Supported by the frame 11 is a spray nozzle 17 which provides both the resin spray and the auxiliary air streams, as best illustrated in FIGURE 2 of the drawings. The resin spray issues from the nozzle 17 through a central orifice provided with a needle valve 18 which controls the amount of fluid flow through the orifice. As the resin issues from the nozzle 17, the compressed air also introduced into the nozzle atomizes the liquid resin composition into a fine spray. Where a diluent has been added to the resin, the liquid is introduced into the spray device at a temperature above the flash point of the diluent so that the diluent is eliminated immediately upon passing through the nozzle. Generally, the temperature of the resin prior to spraying will be of the order of 50 to 150° C.

From FIGURE 1 it will be seen that while the nozzle 17 is supported from the frame 11, there is a substantial amount of free air space on all sides of the nozzle. This feature is important because it provides a much better spray pattern for the material issuing from the nozzle. In the past, where we have employed spray heads in which there was a solid wall immediately behind the spray nozzle there was considerable difficulty with eddy currents being set up which caused excessive turbulence in the spray, and some of the resin was lost by being carried into the flames issuing from the jets 16.

Another important feature resides in controlling the temperature of the flames at the jets 16. For best results, when oxygen and acetylene are used in the system, the flames should have the maximum temperature on the order of 4600° F. This condition is easily determined visually, as it occurs when the flame jets have a dark area immediately adjacent the orifice, a dark blue area centrally of the flame, and a white tip at the end of the flame.

Referring now to FIGURE 2, it will be seen that additional air streams are provided in the nozzle 17 by means of orifices 19 spaced in close proximity to the needle valve 18. The air streams issuing from the orifices 19 are directed in substantially parallel relationship to the axis of the spray issuing from the nozzle 17. Additional air streams are provided by a second set of orifices 21 which also direct air in a substantially parallel direction to the axis of the spray nozzle.

Angularly disposed orifices 23 and 24 are provided in the spray nozzle to direct additional amounts of air at an angle which would intersect the axis of the resin spray a matter of a few inches from the spray head itself.

The result of the air streams issuing from the various orifices in the spray head is to provide a blanket or curtain of air about the resin spray which distorts the normal conical pattern of the spray into a more or less oval form as illustrated in FIGURE 3. Then, when the thus protected resin spray enters the hot gases in the region of the flame jets, the temperature of the resin droplets is raised sufficiently to cause substantial thermosetting of the resin without, however, burning or charring the resin particles.

As the atomized resin spray issues from the central orifice, and is contacted with the auxiliary air streams from the orifices 19, 21, 23, and 24, the temperature of the resin spray a short distance from the nozzle will be substantially at room temperature. In a specific embodiment of the invention, in which the spray head 17 was located about seven inches from a work piece 26 the temperature of the particles midway between the nozzle and the work piece 26 measured about 860° F. However, the particles are at this temperature such a short time that they are not burned by the hot gases, and appear on the surface of the piece 26 as a still liquid deposit which merges into a continuous film. For best results, the work piece 26 is also preheated, normally to a temperature of about 150 to 200° F. A few seconds after the application of the coating, the coating is set sufficiently so that it can be further cooled, for example, by spraying jets of water on the piece 26.

The partly polymerized butadiene-styrene copolymers which have been found particularly useful in the present invention are available commercially under the name "Buton." In the following specific formulations, the "Buton 200" refers to a product containing about 45 to 50% solids, and the remainder being a mixture of about three parts by volume of "Solvesso 100" (a mixture of aromatic hydrocarbons) and one part isopropanol. This material has a specific gravity of 0.925 and has a viscosity of from 1.6 to 2.5 poises.

The "Buton 300" we refer to subsequently is a material containing about 45 to 50% butadiene-styrene copolymer solids and the remainder being a mixture of about three parts by volume "Solvesso 100" and two parts by volume of isopropanol. The specific gravity of this material is 0.913 and its viscosity is 2.5 to 3.5 poises.

The following specific formulae have been sprayed successfully onto pipe in a continuous system to produce film thicknesses ranging from 5 to 10 mils.

*Example I*

| | Percent |
|---|---|
| "Buton 200" | 92 |
| "Aroclor 1254" (chlorinated biphenyl plasticizer) | 2 |
| $Cr_2O_3$ pigment | 6 |

*Example II*

| | Percent |
|---|---|
| "Buton 300" | 94 |
| "Aroclor 1254" | 1.5 |
| $Cr_2O_3$ pigment | 4.5 |

Example III

| | Percent |
|---|---|
| "Buton 300" | 90.24 |
| "Aroclor 1254" | 1.44 |
| Cr$_2$O$_3$ pigment | 4.32 |
| Ethyl acid phosphate (activator) | 4.00 |

Example IV

| | Percent |
|---|---|
| "Buton 300" | 92.5 |
| "Aroclor 1254" | 1.5 |
| Cr$_2$O$_3$ pigment | 4.5 |
| Tetrachlorophthallic anhydride (activator) | 0.5 |
| Ethanol (solvent) | 1.0 |

Example V

| | Percent |
|---|---|
| "Buton 300" | 89.59 |
| "Aroclor 1254" | 1.45 |
| Cr$_2$O$_3$ pigment | 4.46 |
| Tetrachlorophthallic anhydride | 1.5 |
| Ethanol | 3.0 |

Example VI

| | Percent |
|---|---|
| "Buton 300" | 84.87 |
| "Aroclor 1254" | 1.50 |
| Cr$_2$O$_3$ pigment | 4.13 |
| Ethyl acid phosphate | 4.00 |
| Tetrachlorophthallic anhydride | 0.50 |
| Xylol | 3.00 |
| Butyl Cellosolve | 2.00 |

Example VII

| | Percent |
|---|---|
| "Buton 300" | 83.92 |
| "Aroclor 1254" | 1.50 |
| Cr$_2$O$_3$ pigment | 4.08 |
| Ethyl acid phosphate | 4.00 |
| Tetrachlorophthallic anhydride | 1.50 |
| Xylol | 3.00 |
| Butyl Cellosolve | 2.00 |

As indicated in the foregoing specific examples, the compositions employed in the process of the present invention can vary substantially, depending upon the characteristics desired in the coating and the viscosity which the particular spray device can handle effectively. In all cases, it was possible to lay down a satisfactorily thick coating of the set resin by using two adjacent spraying heads of the type shown in the drawings. Additional thicknesses can be built up, of course, by employing an additional number of heads.

We claim as our invention:

1. An apparatus for coating a surface comprising a hollow frame, means providing spaced orifices in said frame, means for feeding a combustible gas mixture to said orifices, a spray nozzle carried by said frame between said spaced orifices, said spray nozzle being spaced from said orifices by substantial free air space permitting substantially unimpeded air flow about said spray nozzle, said nozzle having additional air passages therein arranged to direct a curtain of air about the spray of resin issuing from said spray nozzle.

2. An apparatus for coating a surface comprising an open frame assembly including a pair of spaced manifolds each having jets in spaced relation therealong, means for introducing a combustible gas mixture to said jets and a spray nozzle located centrally of said frame assembly between said manifolds, said nozzle being positioned within said frame to provide substantial free air space between said nozzle and the confines of said frame, thereby reducing eddy currents and turbulence in the spray issuing from said nozzle.

References Cited by the Examiner

UNITED STATES PATENTS

| 2,658,009 | 11/53 | Ransburg | 117—104 |
| 2,737,415 | 3/56 | Wheeler-Nicholson | 118—302 |
| 2,746,883 | 5/56 | Powers | 118—302 |
| 2,960,275 | 11/60 | Wolf | 239—85 |

FOREIGN PATENTS

| 611,399 | 10/48 | Great Britain. |

EVERETT W. KIRBY, *Primary Examiner.*

RICHARD D. NEVIUS, ROBERT A. O'LEARY, LOUIS J. DEMBO, *Examiners.*